(No Model.)
J. J. RICKETTS.
COUPLING.
No. 555,264. Patented Feb. 25, 1896.
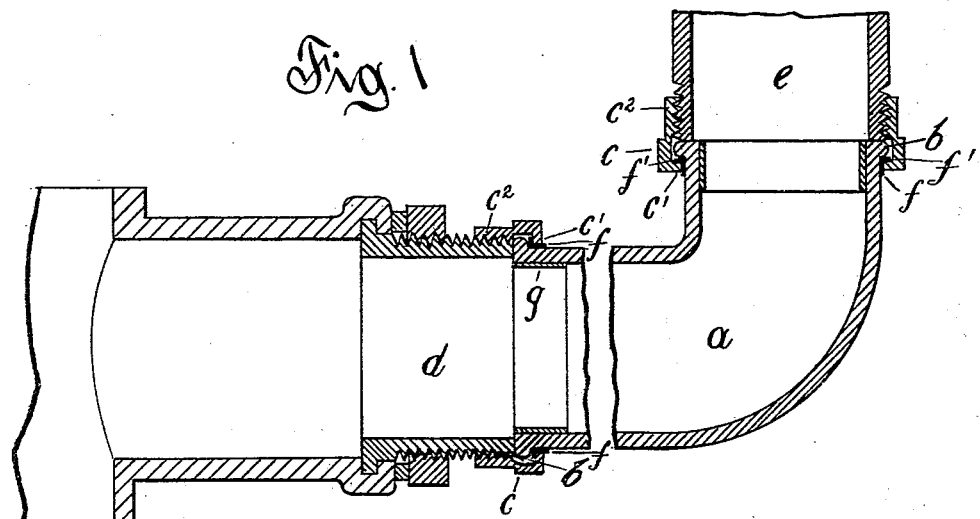
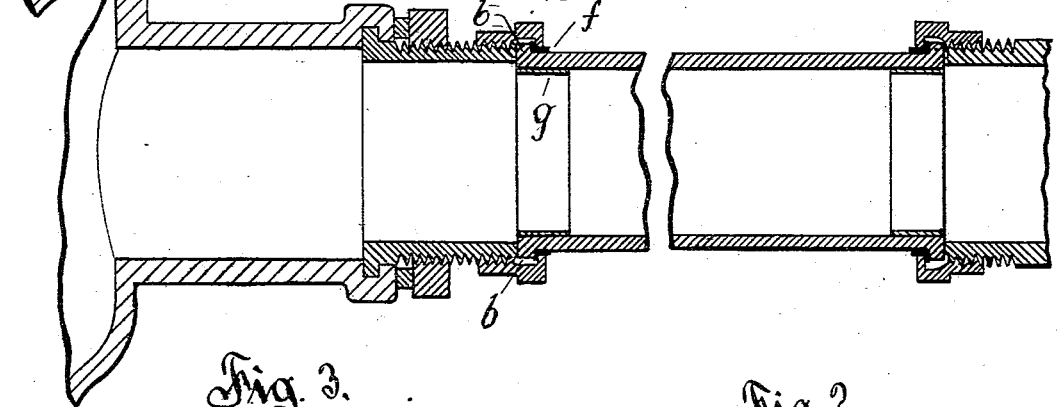
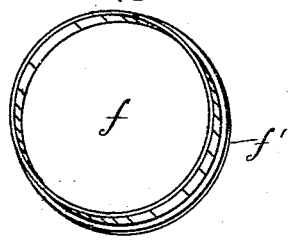
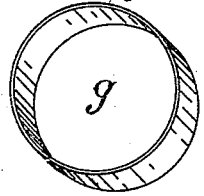
Witnesses.
C. J. Farrar.
Robert C. Totten.
Inventor
James J. Ricketts
By Kay & Totten
Attorneys.

UNITED STATES PATENT OFFICE.

JAMES J. RICKETTS, OF PITTSBURG, PENNSYLVANIA.

COUPLING.

SPECIFICATION forming part of Letters Patent No. 555,264, dated February 25, 1896.

Application filed May 18, 1895. Serial No. 549,769. (No model.)

*To all whom it may concern:*

Be it known that I, JAMES J. RICKETTS, a resident of Pittsburg, in the county of Allegheny and State of Pennsylvania, have invented a new and useful Improvement in Couplings; and I do hereby declare the following to be a full, clear, and exact description thereof.

My invention relates to flexible connections, such as are employed between the bowl of a water-closet and the flush-pipe.

In Letters Patent of the United States No. 434,116, granted to me August 12, 1890, there is set forth a flexible connection to which this invention may be applicable.

The object of the present invention is to preclude all possibility of the flange or beading on the ends of the flexible coupling from freeing itself from the nut or other device which connects said coupling to the flush-pipe or bowl, as the case may be.

My invention comprises, generally stated, a flexible coupling having a flange or beading at its end, a nut or other connecting device having an inwardly-projecting lip adapted to engage said flange or beading, and a locking collar or ring within said coupling adapted to prevent the withdrawal of said flange or beading from said nut.

To enable others skilled in the art to make and use my invention, I will describe the same more fully, referring to the accompanying drawings, in which—

Figure 1 is a sectional view of a flexible coupling connected up to a water-closet bowl and flush-pipe in a manner embodying my invention. Fig. 2 is a view of the ring or collar. Fig. 3 is a view of the thimble, and Fig. 4 is a modified form.

Like letters indicate like parts in each of the figures.

I have illustrated my invention in connection with the nuts which connect the elbow up to the bowl and the flush-pipe of a water-closet; but I do not confine myself to its use with such a bowl or flush-pipe, as it may be applied in other connections.

The elbow $a$ is made of flexible water-tight material, such as india-rubber. Said elbow has the flange or beading $b$ formed at its ends.

By "flange" or "beading" I mean any enlargement which will permit said elbow to engage with the nut in the manner fully hereinafter set forth. This flange or beading $b$ is adapted to engage with the inwardly-projecting lip $c'$, formed in the swivel-nut $c$, said swivel-nut having the threaded portion $c^2$, whereby said nut may be connected up to the spud $d$ or the flush-pipe $e$. By compressing the end of the elbow the flange or beading $b$ may be inserted within the nut, so as to engage with the lip $c'$ of said nut. The thimble $f$ is also preferably employed to aid in holding said flange or beading within said nut. This thimble $f$ is formed from light sheet brass or other suitable metal and has the flange $f'$. This thimble is inserted with its flange $f'$ resting against the lip $c'$ of the nut $c$. The thimble being of larger diameter than the opening in the nut, said thimble is slightly compressed when inserting it within said nut; but when once therein it springs back to shape and has its flange engaging with the lip $c'$. The end of the elbow is then inserted, when the flange or beading $b$ will have its inner face in contact with the flange $f'$ of the thimble $f$, while said thimble encircles said elbow adjacent to said flange or beading. The thimble forms a bearing for the nut, so that when said nut is turned it will not turn in contact with the rubber walls of the elbow, thus preventing the cutting or tearing of the rubber. Furthermore, by the use of the thimble a smaller flange or beading can be employed.

Within the elbow $a$ I insert the ring or collar $g$, which fits snugly therein. This ring $g$ may be of any suitable length which will support the inner walls of the elbow adjacent to the ends thereof, so as to prevent any compression on the part of said elbow at the ends. The ring or collar $g$ acting to prevent the compression of the elbow from within and the thimble $f$ binding it from without, it is practically impossible to pull the flange or beading $b$ from the nut.

In Fig. 4 I have illustrated my invention in connection with a straight flexible coupling. In this figure the flanges or beading at the ends of the coupling are square. All liability of the flange or beading b being withdrawn from the nut when the elbow is subject to a jar or strain is avoided.

What I claim as my invention, and desire to secure by Letters Patent, is—

1. The combination of a flexible coupling having an enlargement at the end thereof, a nut having an inwardly-projecting lip therein with which said enlargement engages, and a locking ring or collar inserted within said coupling, substantially as set forth.

2. The combination of a flexible coupling having an enlargement at the end thereof, a nut having an inwardly-projecting lip therein with which said enlargement engages, a thimble on the outside of said elbow having a flange engaging said lip, and a locking ring or collar inserted within said coupling, substantially as set forth.

In testimony whereof I, the said JAMES J. RICKETTS, have hereunto set my hand.

JAMES J. RICKETTS.

Witnesses:
ROBT. D. TOTTEN,
ROBERT C. TOTTEN.